Figure 1:
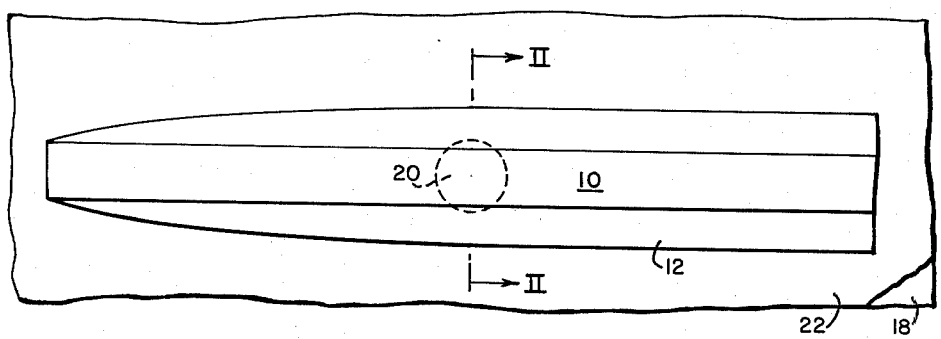

Aug. 17, 1965   T. R. HARKINS ETAL   3,201,210
TRIM MEMBER ASSEMBLY
Filed Jan. 3, 1963

3,201,210
TRIM MEMBER ASSEMBLY
Thomas R. Harkins, Pittsburgh, and Donald R. Zaremski, Cheswick, Pa., assignors to Allegheny Ludlum Steel Corporation, Brackenridge, Pa., a corporation of Pennsylvania
Filed Jan. 3, 1963, Ser. No. 249,191
5 Claims. (Cl. 29—183.5)

This invention relates to the preventing of red rust formation in the vicinity of a stainless steel trim member mounted on a painted mild steel body member and to the enhancing of the crevice corrosion properties of such trim members.

Stainless steel provides an excellent material for trim and decorative moldings for automotive uses, and provides outstanding resistance against weather, atmosphere and other types of corrosive elements in road service. Stainless steel also has a bright, lustrous and attractive surface, particularly stainless steel strip material with a No. 2 automotive strip finish which the automobile manufacturers form into trim and further buff and polish to enhance the bright and attractive metallic luster. No other metal used as automotive trim has the strength nor provides such a lasting attractive finish as stainless steel. Years after its application as a trim member, the stainless steel may be cleaned and restored to its original bright and lustrous appearance.

In practice, however, it has been found that sporadic rusting attack occurs at the areas of contact between the stainless steel trim and the automotive body panels (usually of mild steel) and, in particular, in the areas of the metal clips which are employed to retain the trim members on the body panels. While such rusting does not detract from the appearance of the stainless steel, it does show appreciable build-up of rust corrosion products at the edge of the molding and across the face of the body panel. The corrosion products which form in this manner originate from corrosive attack of the carbon steel body and clip members instead of the stainless steel trim member. There is evidence that the contact of stainless with carbon steel tends to accelerate the attack on the carbon steel body because of galvanic potentials. This will be readily understood, since stainless steel in its normal corrosion resistant condition possesses a noble or passive potential, while carbon steel has a highly active potential. The difference in potential that exists between a stainless steel trim member and a carbon steel body may be as high as approximately one-half volt.

Different coatings of paint and organic materials have been suggested in the past for use between the stainless steel trim and painted carbon steel body panels to retard the rust bleeding therebetween but in all of the known trials, corrosion of the body panels eventually penetrates any such coating in a manner similar to the penetration of the paint on the body panel. This will be appreciated, for all known coatings will contain some pores or pits to permit initiation of corrosion of the body panel. Further, trim members of stainless steel are usually mounted in contact on such body members as by means of mild steel clips which are secured to the body panel, such points of securing usually having been made with a break in the coating applied thereto. Also damage to the coated surface of the body panel is often encountered along the edge contact of the trim member with the body panel to thereby provide additional areas of possible corrosive attack.

The corrosive attack referred to hereinbefore is primarily that of a galvanic reaction between the stainless steel trim member and the less noble mild steel of the body panel. In addition, another corrosion attack is often encountered in the use of stainless steel trim members on body panels of mild steel, such corrosion attack being on the stainless steel per se and being known as crevice or contact corrosion. Crevice corrosion is usually found where the stainless steel is in direct contact with a dissimilar material such as plastic, glass or a painted body panel and where there is no electrical current flowing therebetween but where the contact is of such a nature that it is impossible for the oxygen of the air to form the normal passivating film on the stainless steel that inherently imparts the corrosion characteristics to stainless steel. Where such a situation occurs and the mounted stainless steel trim is subjected to normal winter hazard driving weather conditions where various salts are used for de-icing and snow driving conditions and corrosive environments are encountered, such corrosive environments and salts of the driving conditions will penetrate the contact joint and attack the stainless steel in the areas not protected by the passivating film with the result that red rust is formed from the stainless steel itself.

Recently, as taught in application Serial No. 204,333 filed June 22, 1962, in the names of W. G. Renshaw and R. A. Lincoln and assigned to the assignee of this invention, it has been found that stainless steel trim members having a thin coating of zinc present on the attachment surfaces (that is, the contacting surfaces) thereof will have enhanced corrosion properties when used on mild steel body panels in that the zinc being less noble than the mild steel, the zinc will corrode sacrificially with respect thereto under any galvanic action encountered to give a white rust that can be readily wiped away from the exposed surface of the body panel. In addition, the zinc layer on the attachment surface will enhance the crevice corrosion of the stainless steel.

While the invention described in the aforesaid application Serial No. 204,333 has constituted an advance in the art, it has now been found through exhaustive road tests and salt spray tests that under general weathering corrosion conditions and/or the galvanic action encountered that the layer of zinc is depleted at such a fast rate that the sacrificial corrosion of the zinc layer will not survive for the normal life expectancy of an automobile. Thus, although the crevice corrosion protection imparted to the stainless steel by the zinc will outlast the actual depletion of the zinc layer, in time, because the zinc is rapidly depleted under general weathering corrosion conditions, a reversal of the galvanic attack will be encountered when the zinc layer is so depleted or sacrificially removed, with the result that the galvanic attack of the mild steel body panel that is less noble than the stainless steel trim member will be initiated after such depletion of the zinc layer with the result that red rust will thereafter appear on the body member.

The requirements of the automobile manufacturers for protection against galvanic attack of the body panels have become quite stringent. Thus, any trim member utilized must provide galvanic protection for a period of time at least equal to the normal life expectancy of the paint. It is believed that any trim member which when mounted on a painted body panel will provide protection against galvanic attack of the mild steel panel in an accelerated salt spray test for from 24 up to 48 hours will be acceptable. The zinc coating of the stainless steel trim member as disclosed in application Serial No. 204,333 referred to hereinbefore will provide crevice corrosion resistance for more than the stated times but under the galvanic sacrificial attack occurring at breaks in the paint coating on mild steel bodies will survive for only 8 to 10 hours under the accelerated salt spray test before being depleted to the point where a reversal of the galvanic action is encountered and red rust from the mild steel body appears. Without the zinc coating, the galvanic attack of the less noble mild steel is so severe that detrimental red rust bleeding of the body panel is encountered in the accelerated salt spray test in less than eight hours. It will, therefore, be appreciated that the previous zinc coating of the stainless trim member is a definite improvement in that protection is provided against detrimental red rust bleeding from the body panel for more than one-third of the normal life expectancy of the paint system as contrasted to the previous red rust bleeding condition encountered with the uncoated stainless steel trim member in less than about one-third of the normal life expectancy of the paint system.

An object of this invention is to provide protection between a stainless steel trim member and a painted mild steel body panel member to prevent red rust formation in the area about the contact therebetween for at least the life expectancy of the paint system.

Another object of this invention is to provide a stainless steel trim member having at least one attachment surface for contacting a painted mild steel body panel and in which said attachment surface carries a composite protective coating formed of a continuous, thin layer of zinc, the outer surface of which carries a continuous, thin layer of a chemical reaction conversion coating product, the conversion coating retarding depletion of the underlying zinc by galvanic attack and the zinc coating providing crevice corrosion resistance for the stainless steel trim member whereby a red rusting corrosion attack of the contacting bodies is prevented for at least the life expectancy of the paint system in the contacting area between the trim member and the body panel.

A further object of this invention is to provide stainless steel with a composite protective coating comprising an adherent thin continuous layer of zinc and a thin continuous layer of a chemical reaction conversion coating product thereover in at least areas designed to contact mild steel articles to provide for a retarded galvanic attack on the zinc coating, the layer of zinc providing cervice corrosion resistance to the coated portions of the stainless steel.

Figure 2:
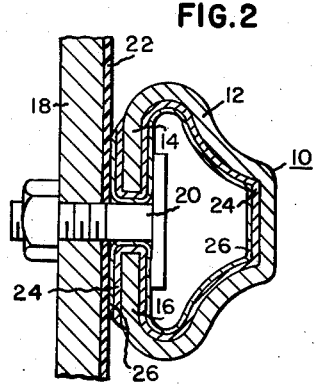

Other objects of this invention will become apparent from the following description when taken in conjunction with the following description and the accompanying drawings in which:

FIGURE 1 is a view in side elevation of a portion of an automobile stainless steel trim member mounted on a section of a painted automobile mild steel body, and FIG. 2 is a view in section and greatly enlarged taken along the line II—II of FIG. 1.

In general, the present invention is directed to a stainless steel trim member and the protection thereof to enhance its use in physical contact with a painted mild steel panel member to provide crevice corrosion resistance for the stainless steel and to prevent red rust galvanic attack of the mild steel during at least the normal life expectancy of the paint system of the assembled bodies. In practicing the present invention at least the contacting or attachment surface or surfaces of the stainless steel trim member is coated with a tightly adherent, continuous, thin layer of zinc having a predetermined initial thickness of from about 15 to $100 \times 10^{-6}$ inches, and preferably of from about 15 to $60 \times 10^{-6}$ inches, as by any conventional manner, for example by electrodeposition. Such thin layer is different from the normal galvanized coatings used to protect the articles to which such normal coatings are applied from galvanic attack in that the normal galvanized coatings have a thickness of about 0.75 to 2.50 ounces per square foot of surface area or from 0.0013 to 0.0042 inch in thickness.

In practice, the zinc coating of the present invention is preferably formed by electrodeposition from a bath consisting of an aqueous solution containing an electrolyte and zinc. Representative baths, and which have previously been employed in the metals industry for plating low alloy and carbon steels, and which have been found to be satisfactory for producing the zinc coatings utilized in this invention, are as follows:

Table I

| Cyanide Zinc Plating Solution | | Acid Zinc Plating Solution | |
|---|---|---|---|
| Temperature Range 20–100° F. | | Temperature Range 130–150° F. pH 3.0–4.0 | |
| Zinc Cyanide, g./l | 60.0 | Zinc Sulfate, g./l | 360 |
| Sodium Cyanide, g./l | 30.0 | Sodium Sulfate, g./l | 75 |
| Sodium Hydroxide, g./l | 78.0 | Magnesium Sulfate, g./l | 60 |
| Powdered Zinc, g./l | 2.4 | | |
| Activated Carbon, g./l | 2.4 | | |

In effecting the electrodeposition of zinc on stainless steel, it has been found that a tight and adherent zinc plated coating is formed on the stainless steel. In practice, the acid baths have been found to provide a superior and more tenacious plate than the cyanide baths. Using a cathodic treatment of 0.25 ampere per square inch of surface area for 42 seconds, a zinc coating having a thickness of $30 \times 10^{-6}$ inches is readily formed on the stainless steel from the acid (sulfate) bath. Substantially uniform coatings of zinc have been formed from the given baths in thickness ranging from 15 to $100 \times^{-6}$ inches by varying the plating current density and time.

Usually in forming such zinc coatings, the surface of the stainless steel is preferably cleaned and activated prior to electroplating by subjecting the surface that is to be plated to the action of a hot alkaline cleaner after which such surface is then immersed in hot sulfuric acid in a manner such as or similar to that described by the American Society for Testing Materials (ASTM Standards, 1961, ASTM Designation: B 354–53, Part 2, "Recommended Practice for Preparation of and Electroplating on Stainless Steel" commencing on page 1136). It will of course, be appreciated that stainless steel surfaces which have just been pickled or bright annealed do not require the alkaline cleaning prior to activation. Preferably, the stainless steel should be removed from the sulfuric acid bath immediately upon detection of hydrogen evolution rather than allowing it to remain in the solution for a minimum of one minute after such evolution commences, as recommended in the aforementioned ASTM specification. This practice will permit the formation of a tight, adhering coating of zinc on the stainless steel without detracting from the bright anneal surface finish thereof. Such zinc coatings having a substantially uniform thickness can be readily formed on AISI Types 430, 201 and 301 stainless steels, as well as others that are suitable for automobile trim members and other decorative uses.

While the zinc coatings just described are satisfactory to provide resistance to crevice corrosion of the stainless steel and to afford some protection against galvanic attack of mild steel bodies when the stainless steel is mounted on mild steel bodies with the zinc coating adjacent such bodies in that the zinc is sacrificially attacked by the galvanic action until depleted, in order to provide a greater measure of protection against galvanic attack of the mild steel body, the zinc coating initially applied to the stainless steel is further treated to form an in situ chemically reacted conversion coating thereon which will retard the sacrificial galvanic attack of the zinc coating on the stainless steel. Preferably such conversion coatings do not increase the initial thickness of the zinc coating and are extremely thin constituting only a minor fraction (about 5% to 40% and preferably about 5% to 25%) of the initial thickness of the zinc coating whereby a major portion of the thickness of the composite coating thus formed is constituted of zinc.

Different materials are known which can be utilized in chemically reacting with the surface layer of the zinc coating to form the desired in situ conversion coating. Preferably such conversion materials are used in practicing this invention in such strengths and applied to the surface of the zinc coating for only predetermined short periods of time of from 10 seconds up to 2 minutes and preferably from 15 seconds to 60 seconds to form only a thin in situ conversion layer on the zinc coating. Among the known materials for effecting the formation of the conversion coatings are two powdered materials sold by Allied Research Products Company of Baltimore, Maryland, at the present time under the identity of "Iridite 8P" and "Iridite 1P" which when suitably mixed with concentrated nitric acid as for example, (1) 7.5 g./l. of "Iridite 8P" powder with 3.2 cc./l. of concentrated nitric acid and (2) 105 g./l. of "Iridite 1P" powder with 39.6 cc./l. of concentrated nitric acid are satisfactory for forming the thin conversion coating on the zinc. Such formulations when applied as by wiping or by dipping the zinc coating therein for the times stated above result in the in situ formation of the ultra-thin layer of chromate conversion coating on the thin zinc coating previously formed.

Another formulation which has been found to be extremely good in the formation of an in situ thin chromate conversion coating on the zinc coating is as follows:

*Table II*

| Constitunte | Symbol | Stock Solution Concentrate | 50/1 Dilution |
|---|---|---|---|
| Water | $H_2O$ | Balance | Balance. |
| Sulfuric acid (sp. gr. 1.84) | $H_2SO_4$ | 6 oz./gal.=25.5 cc./l | 0.50 cc./l. |
| Nitric acid (sp. gr. 1.41) | $HNO_3$ | 32 oz./gal.=177 cc./l | 3.50 cc./l. |
| Acetic acid (glacial) | $CH_3COOH$ | 16 oz./gal.=98.4 cc./l | 1.90 cc./l. |
| Chromic acid | $CrO_3$ | 32 oz./gal.=240 g./l | 4.70 g./l. |
| Sodium Dichromate | $Na_2Cr_2O_7$ | 32 oz./gal.=240 g./l | 4.70 g./l. |

While the standard stock solution give in Table II has been used in dilution of 7 parts of water to 1 part solution concentrate, from our test work and the appearance of the product produced as well as the protection imparted, we prefer to use such stock solution in the form of 40 to 60 parts of water to 1 part solution concentrate and preferably as a 50 to 1 dilution as the desired thin chromate conversion coating is readily formed therewith in a time of 15 to 45 seconds when the zinc coated stainless steel is dipped therein.

Other satisfactory chromate conversion formulations are given in U.S. Patent No. 2,035,380 such as (1) concentrated sulfuric acid (6 cc./l.) with sodium dichromate ($Na_2Cr_2O_7 \cdot 2H_2O$) (200 g./l.) and (2) concentrated sulfuric acid (3 cc./l.) with chromic acid ($CrO_3$) (50 g./l.), the first being diluted for our use in producing the controlled thin chromate conversion coating to one-fourth the recommended concentration, that is, 1.5 cc./l. of concentrated sulfuric acid with 50 g./l. of sodium dichromate, and the second being diluted to one-eighth of the recommended concentration, that is, to 0.38 cc./l. of concentrated sulfuric acid and 6.2 g./l. of chromic acid. Conversion times of up to 2 minutes and preferably from 15 to 60 seconds exposure gave excellent results in all cases, resulting in the controlled thin chromate conversion coatings on the zinc coating previously applied to the stainless steel.

In general, the conversion solutions utilized are not too critical as long as they are dilute enough or the time of application is insufficient to permit a complete conversion of the zinc coating so that the controlled thin conversion coating results. Thus, an acid aqueous solution of hexavalent chromium compounds and which usually contain small amounts of inorganic or organic activators can be used, the hexavalent chromium of the solution reacting with the surface layer of the thin zinc coating. Usually the chromium chromate bath is an aqueous solution that contains at least one hexavalent chromium compound which generally is chromic acid (as $CrO_3$), or a bichromate compound that is acidified to a pH of below 3.5 and often between 1.0 and 2.0. The quantity of chromic acid or bichromate is not critical and as stated hereinbefore is usually used in and for the purpose of this invention in a more dilute solution than is normally used and recommended for producing chromate conversion coatings. Usually the chromium chromate solution is applied to the zinc coating at temperatures ranging from room temperature up to about 130° F. and after treatment, the conversion coated-zinc coated stainless steel is preferably rinsed in water and dried at a temperature of 120° F. to 160° F.

In practicing this invention, the composite coating comprising the zinc coating and the in situ thin conversion coating thereon can be formed at different portions of the manufacturing steps utilized in forming the stainless steel trim member 10 illustrated in FIGS. 1 and 2. Such a trim member 10 is normally formed to have an exposure surface 12 and one or more inwardly turned flanges 14 and 16 which are disposed to provide outer attachment surfaces for seating in contact on a panel 18 of mild steel when attached thereto by mild steel metal clips 20, such panel normally being provided with one or more coatings 22 of paint on the surface to be contacted by the trim member. Preferably the exposure surface 12 of the trim member is free of the composite protective coating described herein and only the attachment surfaces of the flanges 14 and 16 and the undersurface of the trim member are provided with the composite coating formed of the thin layer 24 of zinc and the controlled ultra-thin layer 26 of the in situ conversion coating formed thereon. Thus, the protective composite coating formed of the layers 24 and 26 may be formed on stainless steel strip having a No. 2 automotive finish or such a composite coating can be formed on the trim member after formation thereof.

In applying the protective composite coating on the stainless steel, such stainless steel in the form of clean strip may be subjected to the electrodeposition treatment to deposit on the opposed surfaces thereof a layer 24 of zinc of predetermined thickness within the range given hereinbefore. Thereafter the zinc coated strip can be readily formed directly into the shape of the trim member 10 after which the zinc is buffed off from the exposure surface 12 and the zinc coated attachment surfaces of the flanges 14 and 16 and/or the undersurface of the trim member are thereafter dipped into, wiped with, or otherwise subjected to the conversion solution for the times stated to effect a controlled conversion of a surface layer of the zinc coating 24 on the attachment surfaces and/or on the unbuffed underside of the trim member.

Instead of forming the zinc coated strip into the predetermined shape of the trim member 10, the zinc coated strip can be first subjected to the chemical reaction of the conversion solution to form the thin layer 26 of conversion coating in situ with the zinc layer 24. Thus a zinc conversion coating is formed on top of the zinc. Thereafter, such composite coated strip can be readily formed into the predetermined shape of the trim member 10 and that portion of the composite coating present on the exposure surface can thereafter be readily buffed from such surface to leave only the natural attractive appearance of stainless steel. Of course, the attachment surfaces and the unbuffed underside of the trim member still have the composite coating thereon. If in the forming, as by drawing or the like, of the trim member, the composite coating on the attachment surfaces becomes scratched or otherwise damaged, then the attachment surfaces of the formed trim member are again subjected to the chemical reaction with the conversion solution to insure that a layer of the conversion coating overlies the zinc coating on such attachment surfaces.

It is immaterial at which point in the forming operation that the composite coating is formed on the attachment surface so long as the attachment surface of the final trim member that is to be mounted on the painted automobile carbon steel panel body is provided with a continuous composite coating formed of the layer of zinc and the in situ formed layer of conversion coating thereon as described hereinbefore and the underside of the trim member preferably carries a coating of zinc with or without the conversion coating thereon. Where the clips 20 are formed of mild steel then the undersurface of the trim member 10 preferably carries the composite coating described hereinbefore to retard any galvanic attack between the mild steel of the clip and the stainless steel of the trim member. On the other hand, if the clip 20 is formed of plastic as is sometimes the case, the presence of only the zinc layer on the undersurface of the trim member is adequate to protect the stainless steel trim member from crevice corrosion at the points of contact with the plastic clip.

In operation, where the attachment surface of a stainless steel trim member carries the composite coating previously described and the trim member is mounted on the painted body, it is found that the very thin layer of conversion coating is sufficiently dense and functions as a passivating coating as to protect the layer of zinc thereunder from being depleted by normal weathering corrosion attack under the exposure conditions referred to hereinbefore. On the other hand, controlled thin conversion coating so formed is sufficiently permeable and has a higher electrical resistance than that of the underlying zinc coating so that when exposed to moisture, the conversion coating in effect acts as a conducting coating to permit a retarded galvanic action, that is, an electrochemical flow, between the ferrous (mild steel) base body and the underlying zinc coating in an area adjacent a break in the paint on the mild steel body. Since the conversion coating has a higher electrical resistance (100 to 1,000 microhms) than that of the zinc coating (20 to 50 microhms), it will be appreciated that the galvanic reaction between the mild steel body panel at points of breaks in the paint thereon or adjacent the metal clips and the sacrificial layer of zinc on the trim member will be greatly retarded as contrasted to any galvanic attack that might take place between the mild steel body and a zinc coating that does not have the thin conversion coating thereon. By thus protecting the layer of zinc from general corrosion under weathering conditions so that it will be available for sacrificial corrosion under galvanic attack and at the same time providing for retarding or limiting the degree of galvanic attack, it will be appreciated that the composite coating on the attachment surfaces of stainless steel trim members will afford an extended period of protection before the zinc at any given point of galvanic attack will be depleted sufficiently to permit a reversal of the galvanic action to effect red rusting of the contacted mild steel body.

The advantages of the present invention are evident from the following tests performed with specimens of stainless steel trim members and moldings, using identical specimens of the basic stainless steels (Types 434 and 201), one set being uncoated trim members, a second set having only the zinc coating (from 0.015 to 0.045 mil thick) on the attachment surfaces and the third set having the composite coating, formed of the zinc layer (0.030 and 0.045 mil thick) and the in situ formed thin conversion coating (30 and 60 seconds, respectively, treatment) thereon, on the attachment surfaces.

In the first test, samples from each of the three described sets were mounted with their attachment surfaces held tightly against a painted panel of mild steel under a pressure of 12 inch pounds torque by means of a plastic jig with an external metal connector being connected between the exposure surface of each of the stainless steel trim members and the mild steel panel to insure electrical continuity therebetween. Uniform holes having a diameter of 0.005 inch were then drilled through the painted surface of the mild steel panel at spaced points along the top edge of each of the trim member specimens to simulate paint damage or break-down thereof such as might be encountered in normal use of an automobile. The assembled specimens were then exposed to a standard 5% neutral salt spray atmosphere. Under such test, it was found that red rust appeared at the holes adjacent the samples of the first two sets, that is, the uncoated stainless steel samples and the zinc coated stainless steel samples, within eight hours and that such rusting was quite severe in twenty-four hours' exposure. On the other hand, no sign of rusting at the holes adjacent the third set of samples, that is, those having the described composite coating on the attachment surface, appeared during a test time of 120 hours. Thereafter slight signs of rusting appeared at the holes adjacent the sample having the 0.030 mil layer of zinc plus 30 seconds' conversion treatment, but the sample having the 0.045 mil layer of zinc plus 60 seconds' conversion treatment was free of any signs of rust up to 288 hours of test at which time the test was concluded.

In another test, samples from each of the three sets of trim members described hereinbefore were mounted under 12 inch pounds of torque on plastic panels by means of commercial molding clips of mild steel and the assembly was then subjected to the 5% neutral salt spray test. Such test is conducted in a 5% NaCl fog atmosphere maintained at a temperature of 95° F.+2° to −3° and within a pH range of 6.5 to 7.2 for a time of usually 36 hours. Under such test conditions, red rust bleeding occurred at the metal molding clips holding the first two sets of samples, that is, the uncoated specimens and the zinc coated specimens in less than 72 hours of exposure, whereas, no red rust was visible in the vicinity of the third set of samples, that is, the conversion coated-zinc plated (0.030 and 0.045 mil) specimens after 336 hours of test.

A third test was devised to test the crevice corrosion resistance of each of the three sets of samples described hereinbefore. In this test, samples from each of the three sets of moldings were held with their attachment surfaces in intimate contact with a plastic panel by means of a hold-down block that was tightened to 12 inch pounds of torque and exposed to the standard CASS (copper acetic acid spray) test. The CASS test is a standard acceptance test for automotive stainless steels and is run in a conventional salt spray cabinet for 16 hours under ASTM specified neutral salt spray conditions. The fog atmosphere consists of cupric chloride, sodium chloride and acetic acid, the latter being added in minor amounts to maintain a collectate pH of 3.2±0.1. As thus tested the uncoated specimens of the first set suffered severe crevice corrosion and rust bleeding within 16 hours, whereas, the specimens of the other two sets did not show any evidence of failure although from the appearance viewpoint, the conversion coated-zinc plated specimens had a better appearance than the zinc coated specimens after such test.

The present invention is of particular value in the use of stainless steel trim and molding members on panels and with clips of non-stainless grades commonly referred to as "mild steel" and "carbon steel." Such latter steels are to be interpreted as including all the non-stainless grades which readily corrode, including those containing less than about 5% of chromium, molybdenum or nickel and, in particular, steels commonly employed in the manufacture of clips and automobile bodies, doors, fenders and the like, such as AISI Types 1010, 1020, etc. On the other hand, the term "stainless steel" is to be interpreted as including those grades commonly employed in the manufacture of automotive trim parts and moldings, such as AISI Type 430 and modifications thereof such as Type 434 (Type 430 plus 1% molybdenum), as well as AISI Types 301 and 201. The term "stainless steel" as used herein also includes those grades which contain from 10% to 30% chromium plus either residual nickel such as exists in the nominally ferritic and martensitic steels or small amounts of nickel as in the case of some of the hardenable grades of the non-austenitic stainless steels and including the austenitic grades containing up to 30% nickel. The 10% to 30% chromium steels may also contain residual or small definite amounts of molybdenum, vanadium, titanium, columbium, tungsten, boron, nitrogen and silicon.

This invention has greatly enhanced the use of stainless steel trim members on painted mild steel supporting bodies in that it prevents or at least retards the formation of a red rusting condition adjacent the areas of contact between such bodies particularly in automotive applications for more than the normal life expectancy of such assemblies. No special skills are required in practicing the present invention although care should be exercised in controlling the thickness of the ultra-thin in situ conversion coating formed on the thin zinc coating as described so as to maintain a definite thickness of zinc present thereunder to insure the presence of zinc for corroding sacrifically with respect to the mild steel under any galvanic action encountered therebetween during service.

We claim:

1. In a stainless steel trim member having an exposure surface of stainless decorative quality and at least one attachment surface disposed to be seated in assembled contact with a painted ferrous base body member that is less noble than stainless steel, said assembly being disposed to be subjected to normal weathering corrosion conditions and, when said paint is broken in the vicinity of said attachment surface, to galvanic reaction between said trim member and said body member, the improvement comprising, an adherent zinc coating having an initial thickness of from .000015 inch to .0001 inch carried by and continuously distributed over said attachment surface, and a thin in situ chemical reaction conversion coating extending over and carried by said zinc coating without increasing the initial thickness of said zinc coating, said conversion coating constituting only a minor portion of the initial thickness of said zinc coating whereby a continuous zinc coating is present beneath said conversion coating, said conversion coating being sufficiently dense to prevent dissipation of said zinc coating under normal weathering corrosion conditions encountered in service and having a permeable structure to permit a retarded sacrificial galvanic attack of said zinc coating when said breaks in said paint appear to thereby prevent a galvanic attack of said body member and the formation of red rust thereon in the vicinity of said trim member, said exposure surface being substantially free of said coatings.

2. In a stainless steel trim member having an exposure surface of stainless decorative quality and at least one attachment surface disposed to be seated in assembled contact with a painted ferrous base body member that is less noble than stainless steel, said assembly being disposed to be subjected to normal weathering corrosion conditions and, when said paint is broken in the vicinity of said attachment surface, to galvanic reaction between said trim member and said body member, the improvement comprising, an adherent zinc coating having an initial thickness of from .000015 inch to .0001 inch carried by and continuously distributed over said attachment surface, and a thin in situ chromate conversion coating extending over and carried by said zinc coating without increasing the initial thickness of said zinc coating, said conversion coating constituting only a minor portion of the initial thickness of said zinc coating whereby a continuous zinc coating is present beneath said conversion coating, said conversion coating being sufficiently dense to prevent dissipation of said zinc coating under normal weathering corrosion conditions encountered in service and having a permeable structure to permit a retarded sacrificial galvanic attack of said zinc coating when said breaks in said paint appear to thereby prevent a galvanic attack of said body member and the formation of red rust thereon in the vicinity of said trim member, said exposure surface being substantially free of said coatings.

3. In a stainless steel trim member having an exposure surface of stainless decorative quality and at least one attachment surface disposed to be seated in assembled contact with a painted ferrous base body member that is less noble than stainless steel, said assembly being disposed to be subjected to normal weathering corrosion conditions and, when said paint is broken in the vicinity of said attachment surface, to galvanic reaction between said trim member and said body member, the improvement comprising, an adherent zinc coating having an initial thickness of from .000015 inch to .0001 inch carried by and continuously distributed over said attachment surface, and a thin in situ chromate conversion coating extending over and carried by said zinc coating without increasing the initial thickness of said zinc coating, said conversion coating constituting between 5% and 40% of the initial thickness of said zinc coating whereby a continuous zinc coating is present beneath said conversion coating, said conversion coating being sufficiently dense to prevent dissipation of said zinc coating under normal weathering corrosion conditions encountered in service and having a permeable structure to permit a retarded sacrificial galvanic attack of said zinc coating when said breaks in said paint appear to thereby prevent a galvanic attack of said body member and the formation of red rust thereon in the vicinity of said trim member, said exposure surface being substantially free of said coatings.

4. In a stainless steel trim member having an exposure surface of stainless decorative quality, an undersurface, and at least one attachment surface disposed to be disposed to be subjected to normal weathering corrosion contact with a painted ferrous base body member that is less noble than stainless steel, said assembly being disposed to be subjected to normal weathering corrosion conditions and to galvanic reaction between said clip members and said trim member, and when said paint is broken in the vicinity of said attachment surface, to galvanic reaction between said trim member and said body member, the improvement comprising, and adherent zinc coating having an initial thickness of from .000015 inch to .0001 inch carried by and continuously distributed over said attachment surface and said undersurface, and a thin in situ chemical reaction conversion coating extending over and carried by said zinc coating without increasing the initial thickness of said zinc coating, said conversion coating constituting only a minor portion of the initial thickness of said zinc coating whereby a continuous zinc coating is present beneath said conversion coating, said conversion coating being sufficiently dense to prevent dissipation of said zinc coating under normal weathering corrosion conditions encountered in service and having a permeable structure to permit a retarded sacrificial galvanic attack of said zinc coating to prevent a galvanic attack of said clip members and said body member and the formation of red rust thereon in the vicinity of said trim member, said exposure surface being substantially free of said coatings.

5. In a stainless steel trim member having an exposure surface of stainless decorative quality, an undersurface, and at least one attachment surface disposed to be secured by mild steel clip members in seated assembled contact with a painted ferrous base body member that is less noble than stainless steel, said assembly being disposed to be subjected to normal weathering corrosion conditions and to galvanic reaction between said clip members and said trim member, and when said paint is broken in the vicinity of said attachment surface, to galvanic reaction between said trim member and said body member, the improvement comprising, an adherent zinc coating having an ititial thickness of from .000015 inch to .0001 inch carried by and continuously distributed over said attachment surface and said undersurface, and a thin in situ chromate conversion coating extending over and carried by said zinc coating without increasing the initial thickness of said zinc coating, said conversion coating constituting between 5% and 40% of the initial thickness of said zinc coating whereby a continuous zinc coating is present beneath said conversion coating, said conversion coating being sufficiently dense to prevent dissipation of said zinc coating under normal weathering corrosion conditions encountered in service and having a permeable structure to permit a retarded sacrificial galvanic attack of said zinc coating to prevent a galvanic attack of said clip members and said body member and the formation of red rust thereon in the vicinity of said trim member, said exposure surface being substantially free of said coatings.

References Cited by the Examiner

UNITED STATES PATENTS

| | | | |
|---|---|---|---|
| 1,972,835 | 9/34 | Tainton | 204—55 X |
| 2,294,750 | 9/42 | Harris | 29—196.5 |
| 2,547,947 | 4/51 | Kleis | 29—196.5 X |
| 2,738,897 | 3/56 | Russell | 29—195 |
| 2,768,103 | 10/56 | Schuster et al. | 148—6.2 |
| 2,964,432 | 12/60 | Francis | 148—6.2 |
| 2,977,259 | 3/61 | Schmelzer | 148—6.2 |
| 2,991,205 | 7/61 | Lincoln | 148—6.2 |
| 3,087,240 | 4/63 | Gross | 29—195 |
| 3,090,118 | 5/63 | Hanzel | 29—199 X |
| 3,112,231 | 11/63 | Schuster | 148—6.2 |
| 3,097,932 | 7/63 | Goldheim | 29—195 |
| 3,112,231 | 11/63 | Schuster | 148—6.2 |

DAVID L. RECK, *Primary Examiner.*

HYLAND BIZOT, *Examiner.*